(12) United States Patent
Styles et al.

(10) Patent No.: US 9,506,396 B2
(45) Date of Patent: *Nov. 29, 2016

(54) TWIN SCROLL TURBOCHARGER WITH EGR TAKEOFFS

(71) Applicant: Ford Global Technologies, LLC, Dearborn, MI (US)

(72) Inventors: Daniel Joseph Styles, Canton, MI (US); Brad Boyer, Canton, MI (US); Lawrence Marshall, Saint Clair Shores, MI (US); James Leiby, Dryden, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,865

(22) Filed: Sep. 10, 2015

(65) Prior Publication Data

US 2016/0003132 A1 Jan. 7, 2016

Related U.S. Application Data

(60) Continuation of application No. 14/066,239, filed on Oct. 29, 2013, now Pat. No. 9,157,380, which is a division of application No. 12/815,247, filed on Jun. 14, 2010, now Pat. No. 8,567,189.

(51) Int. Cl.
| | |
|---|---|
| *F02D 23/00* | (2006.01) |
| *F02B 37/02* | (2006.01) |
| *F02D 41/00* | (2006.01) |
| *F02D 13/02* | (2006.01) |
| *F02B 37/18* | (2006.01) |

(52) U.S. Cl.
CPC ........... *F02B 37/025* (2013.01); *F02B 37/183* (2013.01); *F02D 13/0242* (2013.01); *F02D 41/0007* (2013.01); *F02D 41/0065* (2013.01); *F02D 41/0077* (2013.01); *F02B 37/18* (2013.01); *F02D 2041/001* (2013.01); *Y02T 10/144* (2013.01); *Y02T 10/47* (2013.01)

(58) Field of Classification Search
CPC .. F02B 37/025; F02B 37/18; F02D 13/0242; F02D 41/0007; F02D 41/0065; Y02T 10/47
USPC ............................ 60/602, 605.2; 123/568.12
See application file for complete search history.

(56) References Cited

U.S. PATENT DOCUMENTS

| | | |
|---|---|---|
| 2,947,295 A | 8/1960 | Aspin |
| 3,872,846 A | 3/1975 | Taplin et al. |

(Continued)

FOREIGN PATENT DOCUMENTS

JP 2004124749 A 4/2004

OTHER PUBLICATIONS

Partial Translation of Office Action of Chinese Application No. 201110166159.7, Issued Oct. 10, 2014, State Intellectual Property Office of PRC, 11 Pages.

*Primary Examiner* — Ching Chang
(74) *Attorney, Agent, or Firm* — Julia Voutyras; Alleman Hall McCoy Russell & Tuttle LLP

(57) ABSTRACT

Systems and methods for operating a twin scroll turbocharged engine with a junction configured to selectively control exhaust gas delivery to an exhaust gas recirculation system and a twin scroll turbine are provided.

22 Claims, 7 Drawing Sheets

(56) References Cited

U.S. PATENT DOCUMENTS

| | | |
|---|---|---|
| 4,924,840 A | 5/1990 | Wade |
| 6,460,519 B1 | 10/2002 | Pierpont |
| 6,647,934 B2 | 11/2003 | Marsh et al. |
| 6,694,736 B2 | 2/2004 | Pflüger |
| 7,134,420 B2 | 11/2006 | Miyashita |
| 7,353,102 B2 | 4/2008 | Narita et al. |
| 7,426,830 B2 | 9/2008 | Schorn et al. |
| 7,644,586 B2 | 1/2010 | Yamagata |
| 8,567,189 B2 * | 10/2013 | Styles ............... F02B 37/025 123/568.12 |
| 9,157,380 B2 * | 10/2015 | Styles ............... F02B 37/025 60/602 |
| 2006/0144375 A1 | 7/2006 | Atkinson et al. |
| 2006/0174621 A1 | 8/2006 | Chen et al. |
| 2008/0184974 A1 | 8/2008 | Kobayashi et al. |

\* cited by examiner

TWIN SCROLL TURBOCHARGER WITH EGR TAKEOFFS

CROSS REFERENCE TO RELATED APPLICATIONS

The present application is a continuation of U.S. patent application Ser. No. 14/066,239, entitled "TWIN SCROLL TURBOCHARGER WITH EGR TAKEOFFS," filed on Oct. 29, 2013, which is a divisional of U.S. patent application Ser. No. 12/815,247, "TWIN SCROLL TURBOCHARGER WITH EGR TAKEOFFS," filed on Jun. 14, 2010, now U.S. Pat. No. 8,567,189, the entire contents of each of which are hereby incorporated by reference for all purposes.

FIELD

The present application relates to twin scroll turbochargers and exhaust gas recirculation.

BACKGROUND AND SUMMARY

Twin scroll turbocharger configurations may be used in turbocharged engines. A twin scroll turbocharger configuration may separate an inlet to a turbine into two separate passages connected to exhaust manifold runners so that exhaust from engine cylinders whose exhaust gas pulses may interfere with each other are separated.

For example, on an I4 engine with a cylinder firing order of 1-3-4-2, exhaust manifold runners 1 and 4 may be connected to a first inlet of a twin scroll turbine and exhaust manifold runners 2 and 3 may be connected to a second inlet of said twin scroll turbine, where the second inlet is different from the first inlet. Separating exhaust gas pulses in this way may, in some examples, result in an increase in efficiency of exhaust gas delivery to a turbine.

However, the inventors herein have recognized that under some engine operating conditions separating exhaust gas pulses as described above may reduce an efficiency of exhaust gas delivery to a turbine. For example, the inventors herein have recognized that under certain engine operating conditions, e.g., high speed and high load conditions, separating exhaust gas pulses as described above may result in an increase in backpressure and pumping work due to, for example, an increase in exhaust gas enthalpy.

The inventors herein have also recognized that high pressure exhaust gas recirculation (EGR) may be used during some conditions in engines with a twin scroll turbocharger configuration. The inventors herein have recognized that if exhaust gas is taken off the exhaust feeding a twin-scroll turbine, pressure pulsations of the exhaust gas driving the turbine may be disadvantageously dampened.

In one example approach, a method for operating an engine with a twin scroll turbine and an EGR system comprises: during a first condition, fluidically separating the scrolls of the twin scroll turbine and operating said engine with reduced EGR; and during a second condition, fluidically combining the scrolls of the twin scroll turbine and operating said engine with increased EGR.

In this way, an engine including a twin scroll turbocharger configuration may be operated using the twin scroll feature in a first mode, and effectively operated using a single scroll to drive the turbine in a second mode, depending on various engine operating conditions.

Additionally, when high pressure EGR is used in an engine with a twin scroll configuration, the exhaust gas supplying the EGR system may be taken off both sides of the twin scroll inlet to the turbine. In this way, dampening and/or unevenness of pressure pulsations of exhaust gas driving the turbine may be reduced.

For example, by opening up the high pressure EGR system and communication between scrolls of a twin scroll turbine during certain engine operating conditions, e.g., during high speed/high load conditions, the high pressure EGR may be used for enrichment reduction and the turbine inlet communication may reduce back pressure and increase a horsepower capability of the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
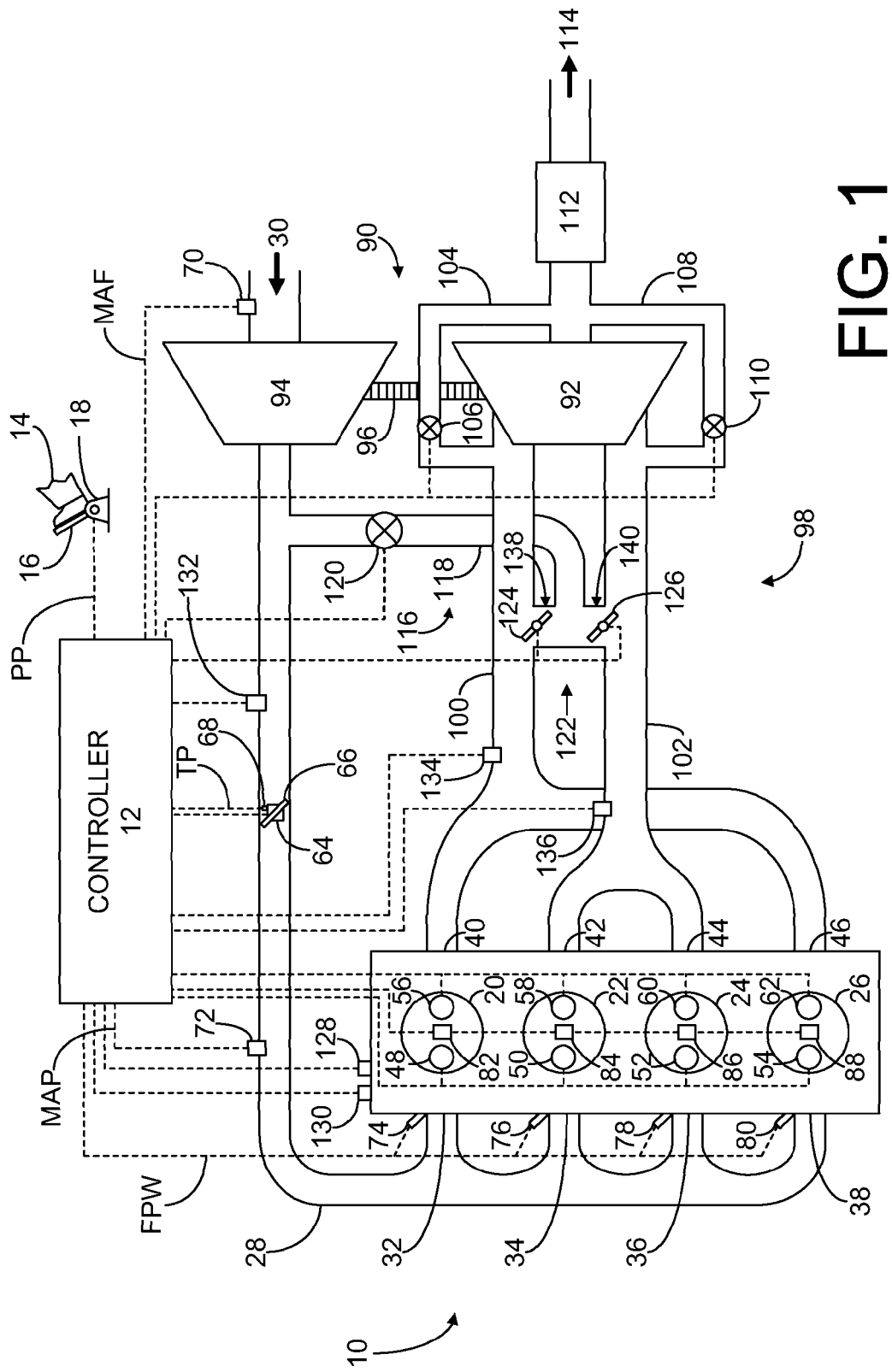
FIG. 1 shows a schematic diagram of an engine including a twin scroll turbocharger and an exhaust gas recirculation (EGR) system.

The following description relates to systems and methods for operating an engine including a twin scroll turbocharger system and an exhaust gas recirculation (EGR) system, for example as shown in FIG. 1.

Twin scroll turbocharger configurations may be used in turbocharged engines. For example, twin scroll turbocharger configurations may be used in gasoline engines where variable vane turbocharger technology may be prohibited due to high operating temperatures of the engine.

In contrast to a single scroll turbocharger configuration which includes a single exhaust gas inlet to the turbine, a twin scroll turbocharger configuration may separate an inlet to a turbine into two separate passages connected to exhaust manifold runners so that exhaust from cylinders whose exhaust gas pulses may interfere with each other are separated.

For example, on an I4 engine with a cylinder firing order of 1-3-4-2, exhaust manifold runners 1 and 4 may be connected to a first inlet of a twin scroll turbine and exhaust manifold runners 2 and 3 may be connected to a second inlet of said twin scroll turbine, where the second inlet is different from the first inlet.

Separating exhaust gas pulses in this way may, in some examples, result in an increase in boost response and turbo efficiency. Advantages of using a twin scroll turbocharger configuration may further include reduction in turbo lag and an increase in volumetric efficiency of the engine. During certain conditions, a greater amount of positive valve overlap and a higher ignition delay may be used in an engine including a twin scroll turbocharger. Additionally, lower exhaust gas temperatures may be obtained and leaner air/fuel ratios may be employed.

However, during certain engine operating conditions, separating exhaust gas pulses as described above may reduce an efficiency of exhaust gas delivery to a turbine. For example, under certain engine operating conditions, e.g., high speed and high load conditions, separating exhaust gas pulses as described above may result in an increase in backpressure and pumping work due to, for example, an increase in exhaust gas enthalpy.

Additionally, high pressure exhaust gas recirculation (EGR) may be used during some conditions in engines with twin scroll turbochargers. However, in some examples, if exhaust gas is taken off the exhaust feeding a twin-scroll turbine, pressure pulsations of the exhaust gas driving the turbine may be disadvantageously dampened.

In order to at least partially address these issues, a junction configured to selectively control exhaust gas delivery to an EGR system and a twin scroll turbine is provided, e.g., as shown in FIGS. 1-5.

Figure 6:
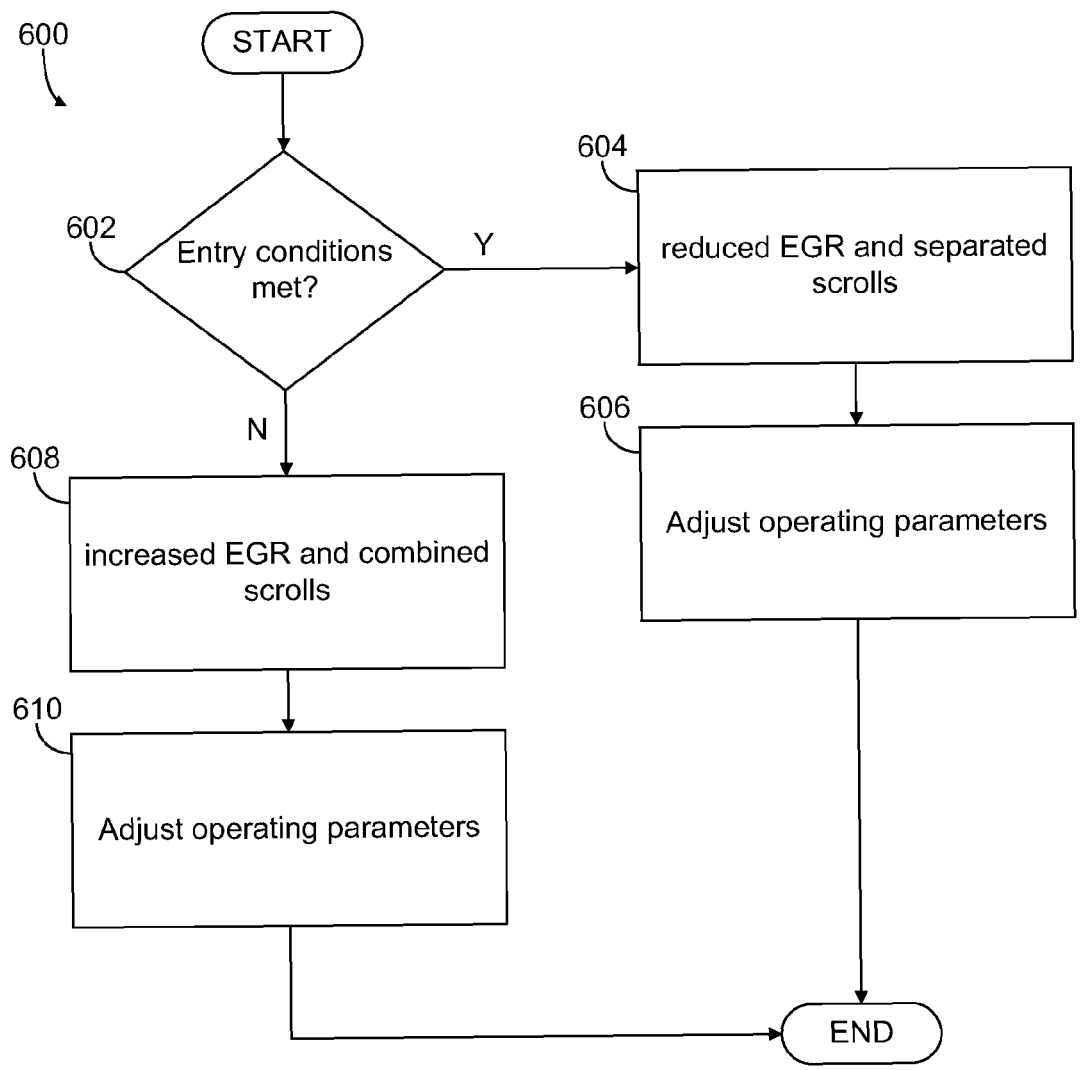
FIG. 6 shows an example method for operating a twin scroll turbocharged engine with a junction configured to selectively control exhaust gas delivery to an exhaust gas recirculation system and a twin scroll turbine.

As shown in the example method in FIG. 6, in a first mode such a junction may be configured to supply exhaust gas to an EGR system from both scrolls of a twin scroll turbine while putting the twin scrolls in fluid communication. In a second mode, such a junction may be configured to shut-off exhaust flow to an EGR system and fluidically separate the scrolls of a twin scroll turbine.

In this way, an engine including a twin scroll turbocharger configuration may be operated using the twin scroll feature in a first mode, and effectively operated using a single scroll to drive the turbine in a second mode, depending on various engine operating conditions.

Additionally, when high pressure EGR is used in an engine with a twin scroll configuration, the exhaust gas supplying the EGR system may be taken off both sides of the twin scroll inlet to the turbine. In this way, dampening and/or unevenness of pressure pulsations of exhaust gas driving the turbine may be reduced.

For example, by opening up the high pressure EGR system and communication between the twin scroll turbine inlets during certain engine operating conditions, e.g., during high speed/high load conditions, the high pressure EGR may be used for enrichment reduction and the turbine inlet communication may reduce back pressure and increase a horsepower capability or power of the engine.

Turning now to FIG. 1, a schematic diagram of an engine 10, which may be included in a propulsion system of an automobile, is shown. Engine 10 may be controlled at least partially by a control system including controller 12 and by input from a vehicle operator 14 via an input device 16. In this example, input device 16 includes an accelerator pedal and a pedal position sensor 18 for generating a proportional pedal position signal PP.

Engine 10 may include a plurality of combustion chambers (i.e., cylinders). In the example shown in FIG. 1, Engine 10 includes combustion chambers 20, 22, 24, and 26, arranged in an inline 4 configuration. It should be understood, however, that though FIG. 1 shows four cylinders, engine 10 may include any number of cylinders in any configuration, e.g., V-6, I-6, V-12, opposed 4, etc.

Though not shown in FIG. 1, each combustion chamber (i.e., cylinder) of engine 10 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 10.

Each combustion chamber may receive intake air from an intake manifold 28 via an air intake passage 30. Intake manifold 28 may be coupled to the combustion chambers via intake ports. For example, intake manifold 28 is shown in FIG. 1 coupled to cylinders 20, 22, 24, and 26 via intake ports 32, 34, 36, and 38 respectively. Each respective intake port may supply air and/or fuel to the respective cylinder for combustion.

Each combustion chamber may exhaust combustion gases via an exhaust port coupled thereto. For example, exhaust ports 40, 42, 44 and 46, are shown in FIG. 1 coupled to cylinders 20, 22, 24, 26, respectively. Each respective exhaust port may direct exhaust combustion gases from a respective cylinder to an exhaust manifold or exhaust passage.

Each cylinder intake port can selectively communicate with the cylinder via an intake valve. For example, cylinders 20, 22, 24, and 26 are shown in FIG. 1 with intake valves 48, 50, 52, and 54, respectively. Likewise, each cylinder exhaust port can selectively communicate with the cylinder via an exhaust valve. For example, cylinders 20, 22, 24, and 26 are shown in FIG. 1 with exhaust valves 56, 58, 60, and 62, respectively. In some examples, each combustion chamber may include two or more intake valves and/or two or more exhaust valves.

Though not shown in FIG. 1, in some examples, each intake and exhaust valve may be operated by an intake cam and an exhaust cam. Alternatively, one or more of the intake and exhaust valves may be operated by an electromechanically controlled valve coil and armature assembly. The position of an intake cam may be determined by an intake cam sensor. The position of exhaust cam may be determined by an exhaust cam sensor.

Intake passage 30 may include a throttle 64 having a throttle plate 66. In this particular example, the position of throttle plate 66 may be varied by controller 12 via a signal provided to an electric motor or actuator included with throttle 64, a configuration that is commonly referred to as electronic throttle control (ETC). In this manner, throttle 64 may be operated to vary the intake air provided the combustion chambers. The position of throttle plate 66 may be provided to controller 12 by throttle position signal TP from a throttle position sensor 68. Intake passage 30 may include a mass air flow sensor 70 and a manifold air pressure sensor 72 for providing respective signals MAF and MAP to controller 12.

In FIG. 1, fuel injectors are shown coupled directly to the combustion chambers for injecting fuel directly therein in proportion to a pulse width of a signal FPW received from controller 12 via an electronic driver, for example. For example, fuel injectors 74, 76, 78, and 80 are shown in FIG. 1 coupled to cylinders 20, 22, 24, and 26, respectively. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake passage 28 in a configuration that provides what is known as port injection of fuel into the intake ports upstream of combustion chambers. Though not shown in FIG. 1, fuel may be delivered to the fuel injectors by a fuel system including a fuel tank, a fuel pump, a fuel line, and a fuel rail.

The combustion chambers of engine 10 may be operated in a compression ignition mode, with or without an ignition spark. In some examples, a distributorless ignition system (not shown) may provide an ignition sparks to spark plugs coupled to the combustion chambers in response to controller 12. For example, spark plugs 82, 84, 86, and 88 are shown in FIG. 1 coupled to cylinders 20, 22, 24, and 26, respectively.

Engine 10 may include a turbocharger 90. Turbocharger 90 may be include a turbine 92 and a compressor 94 coupled on a common shaft 96. The blades of turbine 92 may be caused to rotate about the common shaft as a portion of the exhaust gas stream discharged from engine 10 impinges upon the blades of the turbine. Compressor 94 may be coupled to turbine 92 such that compressor 94 may be actuated when the blades of turbine 92 are caused to rotate. When actuated, compressor 94 may then direct pressurized fresh gas to air intake manifold 28 where it may then be directed to engine 10.

Engine 10 may employ a dual scroll (or twin scroll or two-pulse) turbocharger system 98 wherein at least two separate exhaust gas entry paths flow into and through turbine 92. A dual scroll turbocharger system may be configured to separate exhaust gas from cylinders whose exhaust gas pulses interfere with each other when supplied to turbine 92. For example, FIG. 1 shows a first scroll 100 and a second scroll 102 which are used to supply separate exhaust streams to turbine 92.

For example, if a four-cylinder engine (e.g., an I4 engine such as shown in FIG. 1) has a firing sequence of 1-3-4-2 (e.g., cylinder 20 followed by cylinder 24 followed by cylinder 26 followed by cylinder 22), then cylinder 20 may be ending its expansion stroke and opening its exhaust valves while cylinder 22 still has its exhaust valves open. In a single-scroll or undivided exhaust manifold, the exhaust gas pressure pulse from cylinder 20 may interfere with the ability of cylinder 22 to expel its exhaust gases. However, by using a dual scroll system wherein exhaust ports 40 and 46 from cylinders 20 and 26 are connected to one inlet of the first scroll 100 and exhaust ports 42 and 44 from cylinders 22 and 24 are connected to the second scroll 102, exhaust pulses may be separated and pulse energy driving the turbine may be increased.

Turbine 92 may include at least one wastegate to control an amount of boost provided by said turbine. In a dual scroll system, each scroll may include a corresponding wastegate to control the amount of exhaust gas which passes through turbine 92. For example, in FIG. 1, the first scroll 100 includes a first wastegate 104. First wastegate 104 includes a wastegate valve 106 configured to control an amount of exhaust gas bypassing turbine 92. Likewise, the second scroll 102 includes a second wastegate 108. Second wastegate 108 includes a wastegate valve 110 configured to control an amount of exhaust gas bypassing turbine 92.

Exhaust gases exiting turbine 92 and/or the wastegates may pass through an emission control device 112. Emission control device 112 can include multiple catalyst bricks, in one example. In another example, multiple emission control devices, each with multiple bricks, can be used. In some examples, emission control device 112 may be a three-way type catalyst. In other examples, emission control device 112 may include one or a plurality of a diesel oxidation catalyst (DOC), selective catalytic reduction catalyst (SCR), and a diesel particulate filter (DPF). After passing through emission control device 112, exhaust gas may be directed to a tailpipe 114.

Engine 10 may include an exhaust gas recirculation (EGR) system 116. EGR system 116 may deliver a portion of exhaust gas exiting engine 10 into the engine air intake passage 30. The EGR system includes an EGR conduit 118 coupled to the scrolls 100 and 102 and coupled to the air intake passage 30. In some examples, EGR conduit 118 may include an EGR valve 120 configured to control an amount of recirculated exhaust gas.

Under some conditions, EGR system 116 may be used to regulate the temperature and or dilution of the air and fuel mixture within the combustion chambers, thus providing a method of controlling the timing of ignition during some combustion modes. Further, during some conditions, a portion of combustion gases may be retained or trapped in the combustion chamber by controlling exhaust valve timing.

In some examples, controller 12 may be a conventional microcomputer including: a microprocessor unit, input/output ports, read-only memory, random access memory, keep alive memory, and a conventional data bus. Controller 12 is shown in FIG. 1 receiving various signals from sensors coupled to engine 10, in addition to those signals previously discussed, including: engine coolant temperature (ECT) from a temperature sensor 128; an engine position sensor 130, e.g., a Hall effect sensor 118 sensing crankshaft position. Barometric pressure may also be sensed (sensor not shown) for processing by controller 12. In some examples, engine position sensor 130 produces a predetermined number of equally spaced pulses every revolution of the crankshaft from which engine speed (RPM) can be determined. Additionally, various sensors may be employed to determine turbocharger boost pressure. For example, a pressure sensor 132 may be disposed in intake 30 downstream of compressor 94 to determine boost pressure. Additionally, each scroll of the dual scroll system 98 may include various sensors for monitoring operating conditions of the duel scroll system. For example, the first scroll 100 may include an exhaust gas sensor 134 and the second scroll 102 may include an exhaust gas sensor 136. Exhaust gas sensors 134 and 136 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

EGR conduit 118 may be coupled to both the first scroll 100 and the second scroll 102 of the dual scroll system 98 at a junction 122 so that EGR may be taken off both sides of the dual scroll inlet to the turbine, e.g., to reduce uneven pressure pulsations in driving turbine 92. For example, a first EGR takeoff 138 may be disposed in first scroll 100 and a second EGR takeoff 140 may be disposed in second scroll 102.

Junction 122 may include a valve 124 positioned in the EGR takeoff from first scroll 100 and a valve 126 positioned in the EGR takeoff from second scroll 102. In some examples, valves 124 and 126 may be dual butterfly flaps configured to open and close synchronously. Valves 124 and 126 may be cooled in some examples. For example, the valves may be water-cooled by circulating a suitable coolant, e.g. water or the like, through at least a portion of the valves. As another example, the valves may be air-cooled, e.g., by circulating air through at least a portion of the valves. In this way, exhaust gases may be cooled while passing over the valves.

In a first mode, junction 122 may be configured to supply exhaust gas to EGR system 116 from both scrolls while putting the first and second scrolls in fluid communication. For example, in the first mode valves 124 and 126 may be opened to allow exhaust gas to flow into EGR system 116 while putting the first and second scrolls in fluid communication.

In a second mode, junction 122 may be configured to shut-off exhaust flow to EGR system 116 and fluidically separate the first and second scrolls. For example, in the second mode, valves 124 and 126 may be closed to shut-off exhaust flow to the EGR system while fluidically separating the first and second scrolls.

In some examples, valves 124 and 126 may be adjusted to meter the amount of exhaust gas entering the EGR system and the amount of fluid communication between the first and second scrolls. For example, valves 124 and 126 may be partially opened to reduce an amount of exhaust gas provided to the EGR system and to reduce an amount of fluid communication between the first and second scrolls.

For example, valves 124 and 126 positioned in the EGR takeoffs may function to shutoff the high pressure EGR volume during engine operating conditions where that EGR volume may be detrimental to pressure pulsation driving of the turbine. For example, valves 124 and 126 may be closed during engine accelerations or high load/low speed conditions. In this example, the first and second scrolls are fluidically separated, e.g., to increase driving of the turbine.

As another example, valves 124 and 126 positioned in the EGR takeoffs may function to provide high-pressure EGR during engine operating conditions where air/fuel dilution may be advantageous. For example, valves 124 and 126 may be opened during engine high speed and high load conditions when high pressure EGR may be used for enrichment reduction. In this example, the first and second scrolls are put into fluid communication, e.g., to reduce backpressure.

Figure 2:
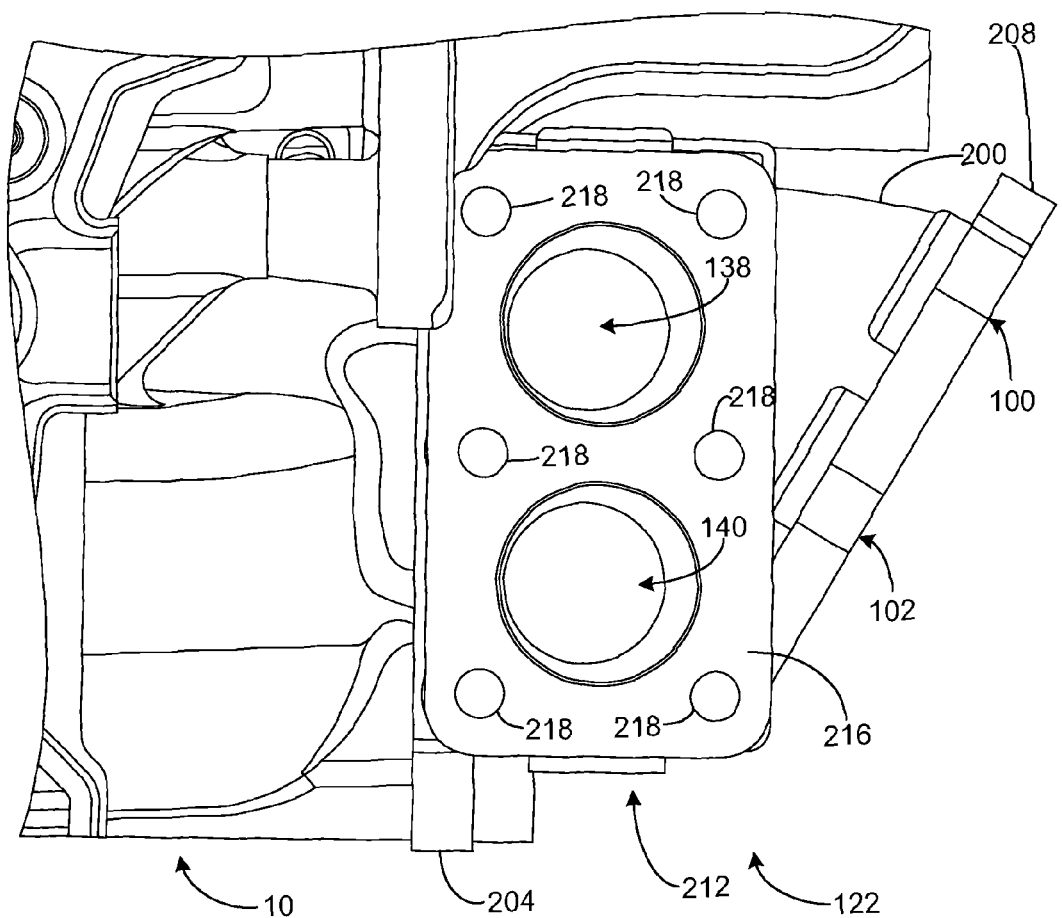
FIG. 2 shows an example high pressure EGR take-off and twin scroll communication valve coupled to an engine.
Figure 3:
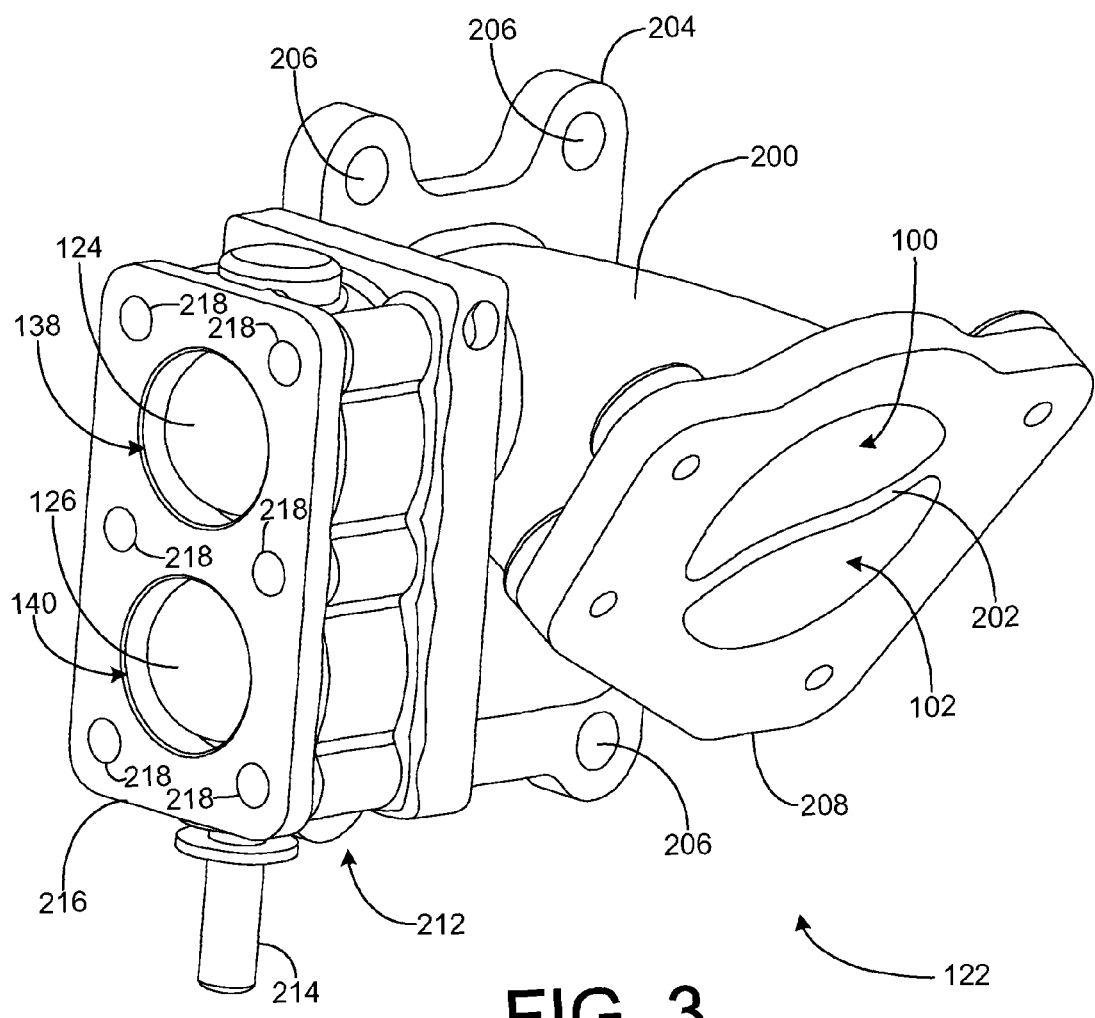
FIGS. 3-5 show various viewpoints of an example high pressure EGR take-off and twin scroll communication valve.
Figure 4:
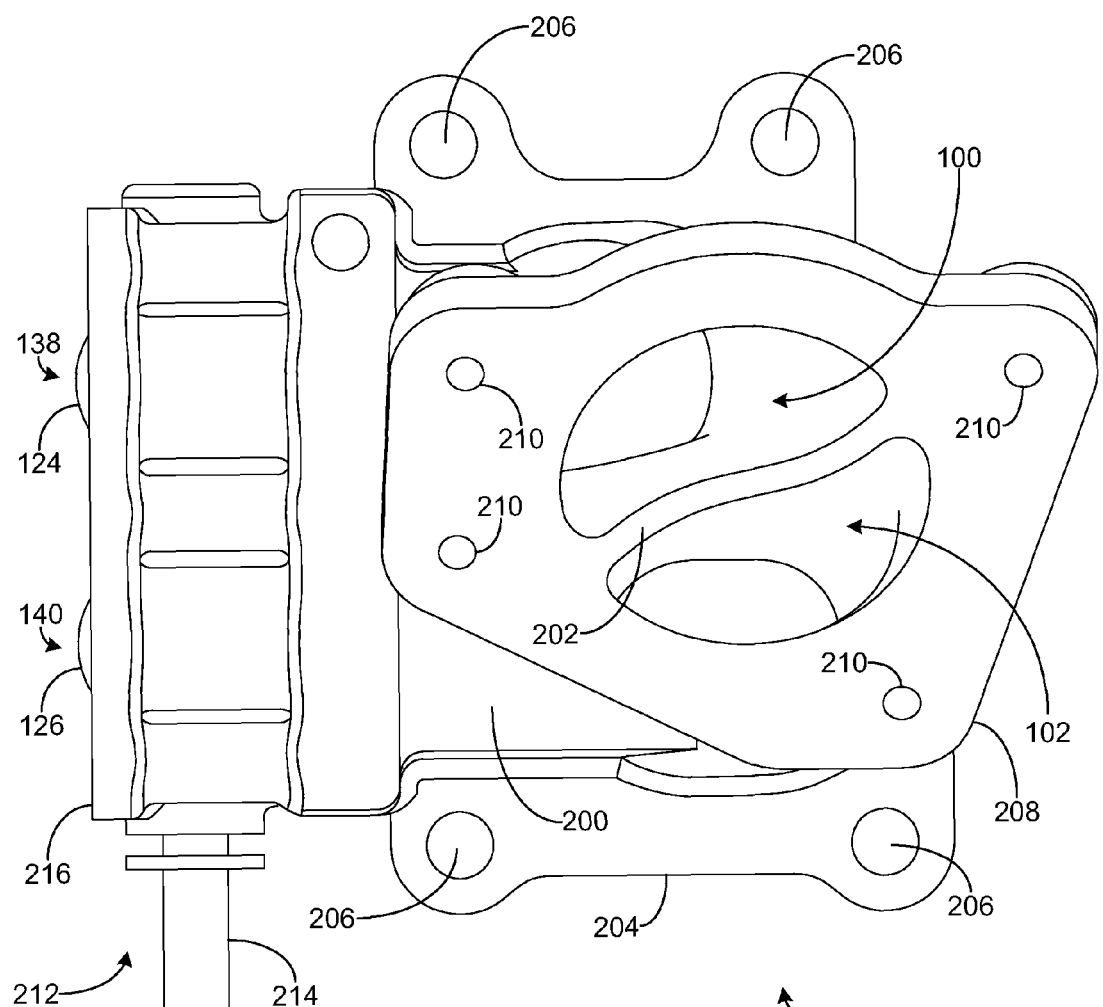
Figure 5:
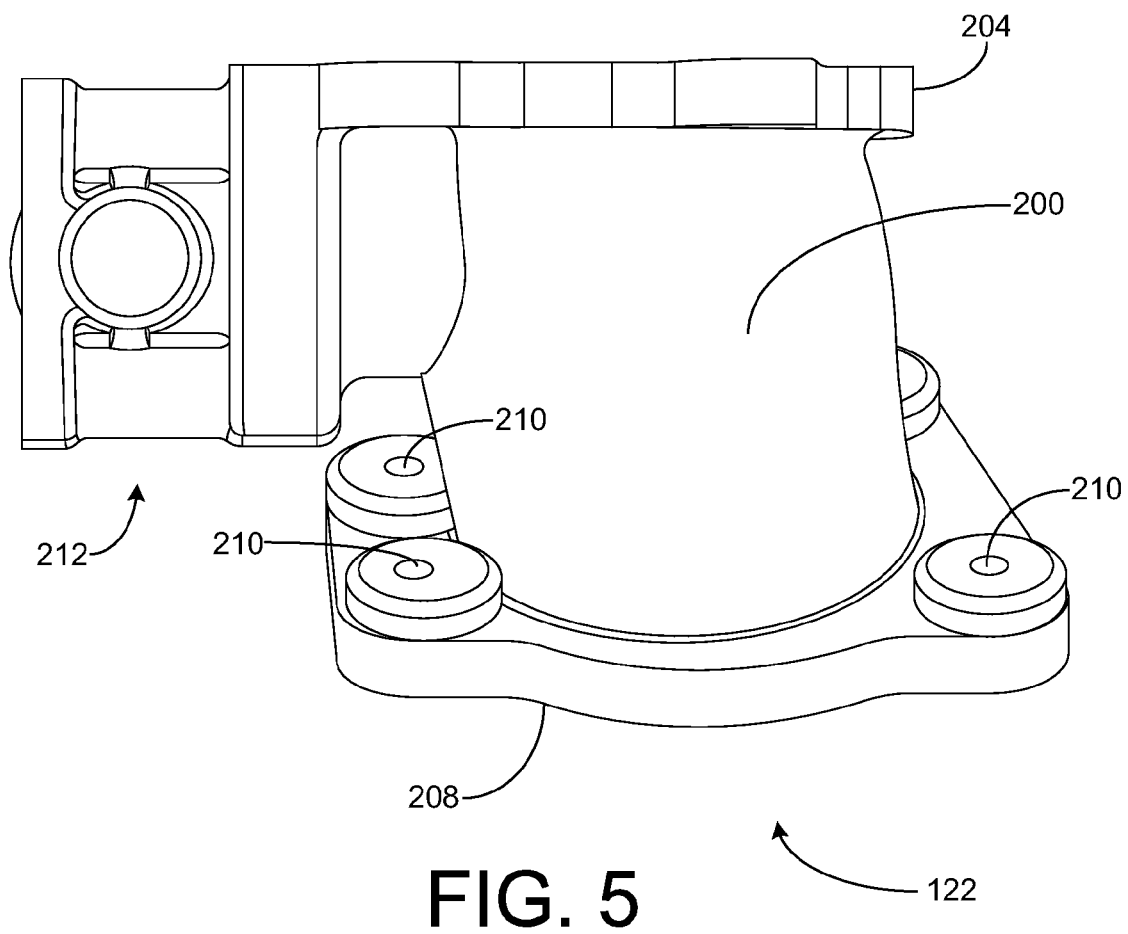

Turning now to FIGS. 2-5, an example junction 122 configured to selectively control exhaust gas delivery to an EGR system and a twin scroll turbine is shown from various viewpoints. Specifically, FIG. 2 shows a side view of example junction 122 coupled to engine 10, FIG. 3 shows a perspective side view of junction 122, FIG. 4 shows a back view of junction 122, and FIG. 5 shows a top view of junction 122. The example junction in FIGS. 2-5 is shown approximately to scale.

Junction 122 may be composed of a variety of suitable materials and may be formed from one or more components. In some examples, junction 122 may be substantially composed of one or more metal materials, e.g. steel or the like. In other examples, the junction may be substantially composed of a polymer material such as a thermoplastic. In still other examples, junction 122 may be composed of a combination of various materials, e.g., both metal and polymer materials.

In some examples, junction 122 may comprise a plurality of components, e.g., junction 122 may be formed from a plurality of components coupled together using suitable coupling methods, e.g., using a suitable welding process and/or via suitable mechanical couplings such as bolts and the like. In other examples, junction 122 may be formed as a single unit, e.g., via suitable molding techniques and/or machining techniques.

Junction 122 includes a plurality of passages partitioned by walls and various valves. In some examples, a thickness of the walls of junction 122 may depend on expected temperatures of exhaust gas passing through the passages. Thus a thickness of the walls may be predetermined based on the type of engine employed. For example, an engine which generates higher exhaust temperatures (e.g., a gasoline engine) may have thicker walls than an engine which generates lower exhaust temperatures (e.g., a diesel engine). Additionally, thickness of the junction walls may depend on a size of the engine employed, e.g., number of cylinders, compression ratio of the cylinders, etc.

Junction 122 includes a dual-bored body shown generally at 200 in FIGS. 2-5. Dual-bored body 200 includes a first bore 100 and a second bore 102, where the first bore 100 corresponds to the first scroll 100 and the second bore 102 corresponds to the second scroll 102 shown schematically in FIG. 1. The first and second bores on body 200 are substantially hollow apertures extending through the body of junction 122.

Dual-bored body 200 is part of a twin scroll turbocharger system, e.g., as shown schematically at 98 in FIG. 1. As described above, a twin scroll turbocharger system may be configured to separate exhaust gas from cylinders whose exhaust gas pulses interfere with each other when supplied to a turbine, e.g., turbine 92 shown in FIG. 1. The first bore 100 of body 200 provides a communication passage between the exhaust of a first set of cylinders and the twin scroll turbine. The second bore 102 of body 200 provides a communication passage between the exhaust of a second set of cylinders, different from the first set of cylinders, and the twin scroll turbine.

For example, if a four-cylinder engine (e.g., an I4 engine such as shown in FIG. 1) has a firing sequence of 1-3-4-2 (e.g., cylinder 20 followed by cylinder 24 followed by cylinder 26 followed by cylinder 22), then the first set of cylinders may include cylinders 20 and 26 and the second set of cylinders may include cylinders 22 and 24. In this way, under some conditions, the first and second bores may separate exhaust gas from cylinders whose exhaust gas pulses interfere with each other when supplied to the turbine.

The first and second bores in dual-bored body 200 form first and second exhaust gas passages, respectively, therethrough. The first and second passages in body 200 may have a variety of shapes, sizes, and contours. In some examples, the sizes, shapes, and/or contours of the bores may be configured to increase energy conferred to the turbine by the exhaust gases flowing therethrough. For example, the first and second bores may have a twisting and/or curved shape, e.g. as shown in FIGS. 3 and 4 at 202, to increase energy conferred to the turbine by exhaust gases. In this way, an acceleration of the exhaust gas may be increased when passing through the bores.

Junction 122 includes an engine mount shown generally at 204 in FIGS. 2-5. Engine mount 204 is coupled to dual-bored body 200 and comprises a substantially flat mounting portion configured to couple with engine 10 and fluidically couple the first bore 100 and the second bore 102 in body 200 to the exhaust of a first set of cylinders and to the exhaust of a second set of cylinders, different from the first set of cylinders, respectively. For example, if a four-cylinder engine (e.g., an I4 engine such as shown in FIG. 1) has a firing sequence of 1-3-4-2 (e.g., cylinder 20 followed by cylinder 24 followed by cylinder 26 followed by cylinder 22), then the first set of cylinders may include cylinders 20 and 26 and the second set of cylinders may include cylinders 22 and 24. FIG. 2 shows junction 122 coupled to engine 10 via engine mount 204.

In some examples, engine mount 204 may comprise a flange configured to assist in a coupling of junction 122 to the engine. Thus engine mount 204 may extend a distance beyond the bore apertures in the engine mount to form the flange. The engine mount may include various features configured to assist in coupling junction 122 to the engine, e.g., via a mechanical coupling.

For example, the engine mount may include a plurality of apertures 206 sized to receive mechanical coupling elements, where the mechanical coupling elements may assist in coupling junction 122 to the engine. For example, mechanical coupling elements may include bolts or the like. In some examples, engine mount 204 may be welded to the engine instead of or in addition to the mechanical couplings described above.

A plurality of features corresponding to the plurality of apertures 206 may be included on engine 10 to assist in coupling junction 122 to the engine. In some examples, the plurality of features included on the engine may include apertures to receive coupling elements. For example, if bolts are used to attach junction 122 to engine 10 via apertures 206, the plurality of features included on the engine may include threaded apertures configured to receive said bolts.

Junction 122 includes a turbine mount shown generally at 208 in FIGS. 2-5. Turbine mount 208 is coupled to an end of the dual-bored body opposing the engine mount 204. Turbine mount 208 comprises a substantially flat mounting portion configured to couple with a twin-scroll turbine, e.g., turbine 92, and fluidically couple the first bore 100 and the second bore 102 in body 200 to a first scroll and a second scroll, respectively, in the twin-scroll turbine.

In some examples, turbine mount 208 may comprise a flange configured to assist in coupling of junction 122 to the turbine. Thus turbine mount 208 may extend a distance beyond the bore apertures in the turbine mount to form the flange. The turbine mount may include various features configured to assist in coupling junction 122 to the turbine, e.g., via a mechanical coupling.

For example, the turbine mount may include a plurality of apertures 210 sized to receive mechanical coupling elements, where the mechanical coupling elements may assist in coupling junction 122 to the turbine. For example, mechanical coupling elements may include bolts or the like. In some examples, turbine mount 208 may be welded to the turbine instead of or in addition to the mechanical couplings described above.

A plurality of features corresponding to the plurality of apertures 210 may be included on the twin-scroll turbine to assist in coupling junction 122 to the turbine. In some examples, the plurality of features included on the turbine may include apertures to receive coupling elements. For example, if bolts are used to attach junction 122 to turbine 92 via apertures 210, the plurality of features included on the turbine may include threaded apertures configured to receive said bolts.

Junction 122 includes an EGR takeoff body shown generally at 212 in FIGS. 2-5. EGR takeoff body 212 is coupled to dual-bored body 200 and includes a first EGR takeoff 138 fluidically coupled to first bore 100 in dual-bored body 200 and a second EGR takeoff 140 fluidically coupled to second bore 102 in dual-bored body 200.

The first EGR takeoff 138 and the second EGR takeoff 140 are passages extending through the EGR takeoff body 212 and are configured to communicate with a common EGR conduit, e.g., EGR conduit 118 shown schematically in FIG. 1.

EGR takeoff body 212 includes a first valve 124 positioned in first EGR takeoff 138 from first bore 100 and a second valve 126 positioned in the second EGR takeoff 140 from second bore 102. In some examples, the first valve 124 and second valve 126 may be dual butterfly flaps configured to open and close synchronously. In such a case, the first and second valves may be coupled to a common rotating valve shaft 214, where the valve shaft may be rotated by a controller, e.g., controller 12, to open and close the dual butterfly valves.

Valves 124 and 126 may be cooled in some examples. For example, the valves may be water-cooled by circulating a suitable coolant, e.g. water or the like, through at least a portion of the valves. As another example, the valves may be air-cooled, e.g., by circulating air through at least a portion of the valves. In this way, exhaust gases may be cooled while passing over the valves.

EGR takeoff body 212 includes an EGR conduit mount shown generally at 216 in FIGS. 2-5. EGR conduit mount 216 comprises a substantially flat mounting portion configured to couple with an EGR conduit, e.g., EGR conduit 118 shown in FIG. 1.

In some examples, EGR conduit mount 216 may comprise a flange configured to assist in coupling of junction 122 to the turbine. Thus, EGR conduit mount 216 may extend a distance beyond the EGR takeoff apertures 138 and 140 to form the flange. The EGR conduit mount 216 may include various features configured to assist in coupling an EGR conduit to the EGR takeoff body 212, e.g., via a mechanical coupling.

For example, EGR conduit mount 216 may include a plurality of apertures 218 sized to receive mechanical coupling elements, where the mechanical coupling elements may assist in coupling an EGR conduit to the EGR takeoff body 212. For example, mechanical coupling elements may include bolts or the like. In some examples, EGR conduit mount 216 may be welded to an EGR conduit instead of or in addition to the mechanical couplings described above.

A plurality of features corresponding the plurality of apertures 218 may be included an EGR conduit to assist in coupling EGR conduit mount 216 to the EGR conduit. In some examples, the plurality of features included on an EGR conduit may include apertures to receive coupling elements. For example, if bolts are used to attach EGR conduit mount 216 to EGR conduit 118 via apertures 218, the plurality of features included on the EGR conduit may include threaded apertures configured to receive said bolts.

FIG. 6 shows an example method 600 for operating a twin scroll turbocharged engine with a junction configured to selectively control exhaust gas delivery to an EGR system and a twin scroll turbine, e.g., junction 122 described above.

At 602, method 600 includes determining if entry conditions are met. In some examples, determining if entry conditions are met may include determining if conditions for using separated twin scrolls to drive a twin scroll turbine are met.

Conditions for using separated twin scrolls to drive a twin scroll turbine may include a variety of engine operating conditions wherein separated scrolls driving the twin scroll turbine may be advantageous to engine operation.

As described above, separating the scrolls may, during some conditions, increase boost response and turbo efficiency. For example, conditions for using separated twin scrolls to drive the turbine may include engine operating conditions where the turbine spools up, e.g., engine operating conditions where a speed of the turbine increases from a first speed to a second speed, where the second speed is greater than the first speed, e.g., during engine acceleration conditions.

Thus, entry conditions may include high load and low speed (RPM) engine operating conditions, e.g., when a high engine torque is requested by an operator of the engine, e.g., via an acceleration pedal. For example, the entry conditions may include an engine load greater than a first predetermined threshold value and engine speed less a second predetermined threshold value.

In some examples, determining if entry conditions are met may include determining if conditions for operating the engine with high pressure EGR are not met or determining if high pressure EGR is not anticipated.

For example, high pressure EGR may be used for enrichment reduction of the air/fuel ratio entering the engine. During high speed/high load engine operating conditions, high pressure EGR may be employed for enrichment reduction. Thus conditions for operating the engine with high pressure EGR may not be met during low speed conditions.

Other examples of conditions for operating the engine with high pressure EGR not being met may include engine operating conditions which have low NOX emissions, low charge density, low engine temperature, and/or combinations thereof.

If entry conditions are met at 602, method 600 proceeds to 604. At 604, method 600 includes operating the engine with a reduced amount of EGR and with separated twin scrolls driving the twin scroll turbine. For example, at 604 engine exhaust gas pulses may be separated to drive the turbine and a first amount of exhaust gas may be recirculated to the engine. In some examples, at 604, the engine may be operated without EGR. For example, valves 124 and 126 may be closed in order to at least partially shut off the EGR takeoffs from the twin scrolls and separate the twin scrolls for driving of the turbine.

At 606, method 600 includes adjusting operating parameters in response to operating the engine without EGR and with separate twin scrolls. Examples of engine operating parameters which may be adjusted in response to operating the engine without EGR and with separate twin scrolls include the air/fuel ratio, throttle position, valve overlap, ignition timing, etc. For example, valve overlap may be increased and/or ignition delay may be increased, e.g., spark timing may be retarded. For example, the engine may be operated with a first amount of positive valve overlap in at least one cylinder of the engine and/or the engine may be operated with a first amount of spark retard in at least one cylinder of the engine. In some examples, the engine may be operated with a first, increased, amount of fuel.

However, if entry conditions are not met at 602, method 600 proceeds to 608. At 608, method 600 includes operating the engine with an increased amount of EGR, e.g., relative to the amount of EGR used in step 604 described above, and with both scrolls of the twin scroll turbine in fluid communication. In this case, the twin scroll turbine may be effectively operated in a single scroll mode, wherein pulse separation may be reduced. For example, at 608 engine exhaust gas pulses may be combined to drive the turbine and a second amount of exhaust gas may be recirculated to the engine, where the second amount of exhaust gas is greater than the first amount of exhaust gas used in step 604 described above. For example valves 124 and 126 in the EGR takeoff body may be at least partially opened to provide exhaust gas take from both scrolls to the EGR system while putting both scrolls in fluid communication. In this case, EGR may be take off both scrolls of the twin scroll turbine via a common EGR passage upstream of the twin scroll turbine, and the amount of EGR taken of each scroll may be substantially the same.

At 610, method 600 includes adjusting operating parameters in response to operating the engine with high-pressure EGR and with both scrolls of the twin scroll system in fluid communication. Such engine operating parameters may include ignition timing (spark timing), air/fuel ratio, amount of fuel injected, valve overlap, etc. For example, spark timing may be advanced and/or an amount of fuel provided to the engine reduced. For example, the engine may be operated with a second amount of positive valve overlap in at least one cylinder of the engine, where the second amount of valve overlap is less than the first amount of valve overlap employed in step 604 described above. As another example, the engine may be operated with a second amount of spark retard in at least one cylinder of the engine, where the second amount of spark retard is less than the first amount of spark retard used in step 604. In some examples, the engine may be operated with a second amount of fuel, where the second amount of fuel is less than the first amount of fuel used in step 604.

In some examples, during certain conditions, e.g., during high speed and high load engine operating conditions, valves 124 and 126 may be opened and EGR valve 120 may be closed to put the turbine scrolls in fluid communication while shutting off EGR flow to the engine. In this way, turbine performance may be increased, e.g., during high speed and high load conditions, via a reduction in backpressure (e.g., increased cylinder blowdown volume via branch communication). Additionally, in some example embodiments, an engine may not include an EGR system but may include a butterfly valve, such as valves 124 and 126, configured to fluidically combine the scrolls of a twin scroll turbine. In this way, turbine performance may be increased during certain engine operating conditions, e.g., during high speed and high load engine operating conditions.

Figure 7:
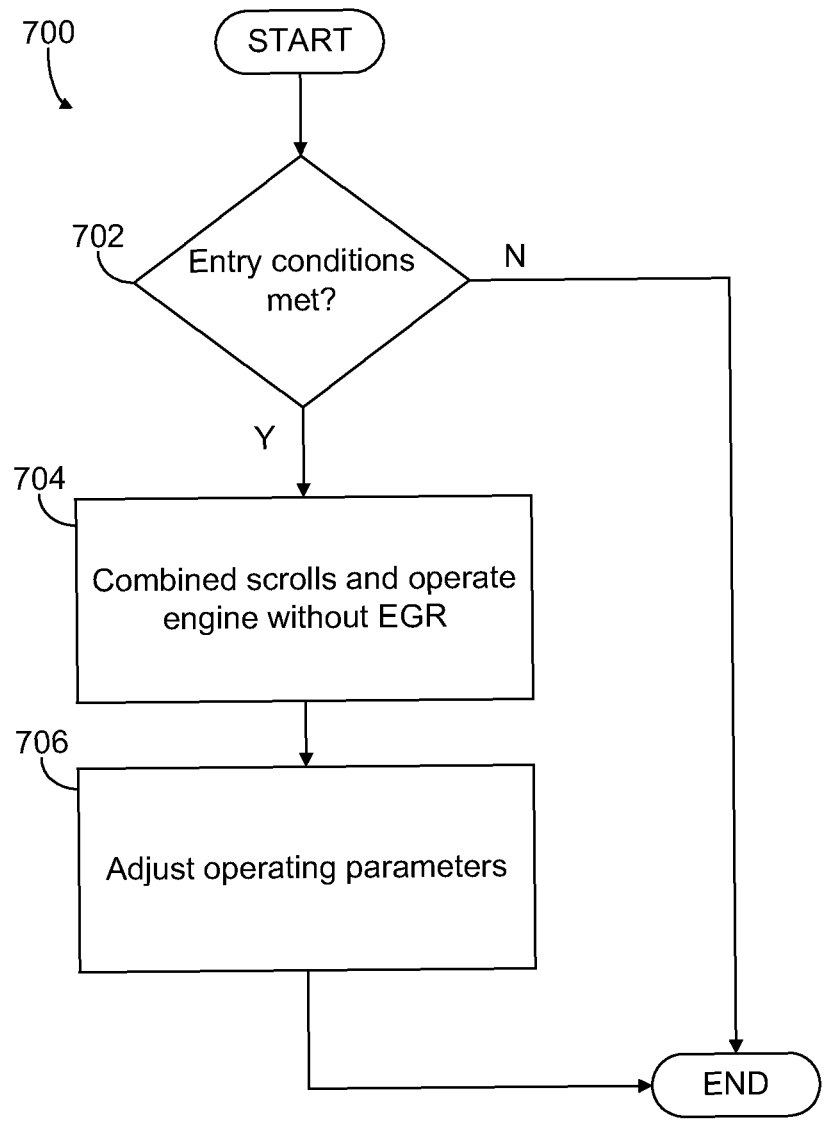
FIG. 7 shows an example method for operating a twin scroll turbocharged engine without EGR.

FIG. 7 shows an example method 700 for operating a twin scroll turbocharged engine without EGR. At 702, method 700 included determining if entry conditions are met. As described above, separating the scrolls may, during some conditions, increase boost response and turbo efficiency. For example, conditions for using separated twin scrolls to drive the turbine may include engine operating conditions where the turbine spools up, e.g., engine operating conditions where a speed of the turbine increases from a first speed to a second speed, where the second speed is greater than the first speed, e.g., during engine acceleration conditions.

Thus, entry conditions may include high load and low speed (RPM) engine operating conditions, e.g., when a high engine torque is requested by an operator of the engine, e.g., via an acceleration pedal. For example, the entry conditions may include an engine load greater than a first predetermined threshold value and engine speed less a second predetermined threshold value. If entry conditions are met at 702, method 700 proceeds to 704.

At 704, method 700 includes operating the engine with both scrolls of the twin scroll turbine in fluid communication and without EGR. For example, valves 124 and 126 may be opened and EGR valve 120 may be closed to put the turbine scrolls in fluid communication while shutting off EGR flow to the engine.

At 706, method 700 includes adjusting operating parameters in response to operating the engine without EGR and with both scrolls of the twin scroll system in fluid communication. Such engine operating parameters may include ignition timing (spark timing), air/fuel ratio, amount of fuel injected, valve overlap, etc. For example, spark timing may be advanced and/or an amount of fuel provided to the engine reduced.

Note that the example systems and methods included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be encoded as microprocessor instructions and stored into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A turbocharged in-line engine system comprising:
a first scroll and a second scroll fluidically coupled to a turbine, the first scroll coupled to a first set of inner engine cylinders, the second scroll coupled to a second set of outer engine cylinders;
a first EGR takeoff including a first valve, the first EGR takeoff fluidically coupled to the first scroll;
a second EGR takeoff including a second valve, the second EGR takeoff fluidically coupled to the second scroll, the first and second valves coupled in a common housing, the first and second valves being dual butterfly valves where the dual butterfly valves are coupled to a common rotating shaft;
a turbine wastegate coupled around the turbine; and
an EGR conduit coupled to the first and second EGR takeoffs.

2. The engine system of claim 1, further comprising
a computer readable storage medium having instructions encoded thereon, including:
instructions to, during a first condition close the first and second valves; and
instructions to, during a second condition open the first and second valves.

3. The engine system of claim 2, wherein the first condition includes high load and low speed engine operating conditions.

4. The engine system of claim 2, wherein the second condition includes high load and high speed engine operating conditions.

5. The engine system of claim 2, wherein the instructions further include instructions to close the first and second valves during engine accelerations.

6. The engine system of claim 2, wherein the instructions further include instructions to operate an engine with a second amount of positive valve overlap in at least one cylinder of the engine during the second condition, where the second amount of positive valve overlap is less than a first amount of positive valve overlap employed during the first condition.

7. The engine system of claim 2, wherein the instructions further include instructions to operate an engine with a second amount of spark retard in at least one cylinder of the engine, where the second amount of spark retard is less than a first amount of spark retard used in the first condition.

8. The engine system of claim 1, wherein the dual butterfly valves include a coolant circulating therethrough.

9. The engine system of claim 1, wherein the first and second valves are configured to open and close synchronously.

10. The engine system of claim 8, wherein the common housing has a dual-bored body housing the dual butterfly valves.

11. The engine system of claim 1, wherein the common housing further comprises a dual-bore body with an engine mount having a substantially flat mounting portion coupled with an engine, and further having a turbine mount opposing the engine mount, the turbine mount having a substantially flat mounting portion coupled with the turbine.

12. A turbocharged engine system, comprising:
a first scroll and a second scroll fluidically coupled to a turbine, the first scroll coupled to a first set of engine cylinders, the second scroll coupled to a second set of engine cylinders;
a first EGR takeoff including a first valve, the first EGR takeoff fluidically coupled to the first scroll;
a second EGR takeoff including a second valve, the second EGR takeoff fluidically coupled to the second scroll, both the first and second EGR takeoffs positioned in a junction therebetween;
an EGR conduit coupled to the first and second EGR takeoffs downstream of the junction; and
a dual-bore body housing the first and second valves, the housing having an engine mount having a substantially flat mounting portion coupled with an engine, and further having a turbine mount opposing the engine mount, the turbine mount having a substantially flat mounting portion coupled with the turbine.

13. The engine system of claim 12, further comprising:
a computer readable storage medium having instructions encoded thereon, including:
instructions to, during a first condition close the first and second valves; and
instructions to, during a second condition open the first and second valves.

14. The engine system of claim 13, wherein the first condition includes high load and low speed engine operating conditions.

15. The engine system of claim 14, wherein the second condition includes high load and high speed engine operating conditions.

16. The engine system of claim 15, wherein the first and second valves are dual butterfly valves.

17. The engine system of claim 16, wherein the dual butterfly valves include a coolant circulating therethrough, and where the dual butterfly valves are coupled to a common rotating shaft.

18. The engine system of claim 16, wherein the dual butterfly valves are housed in the dual-bore body.

19. The engine system of claim 15, wherein the first and second valves are configured to open and close synchronously.

20. The engine system of claim 15, wherein the instructions further include instructions to close the first and second valves during engine accelerations.

21. The engine system of claim 14, wherein the instructions further include instructions to operate the engine with a second amount of spark retard in at least one cylinder of the engine, where the second amount of spark retard is less than a first amount of spark retard used in the first condition.

22. The engine system of claim 14, wherein the instructions further include instructions to operate the engine with a second amount of positive valve overlap in at least one cylinder of the engine during the second condition, where the second amount of positive valve overlap is less than a first amount of positive valve overlap employed during the first condition.

* * * * *